United States Patent [19]

Kuppinger

[11] Patent Number: 4,674,373
[45] Date of Patent: Jun. 23, 1987

[54] METHOD AND APPARATUS FOR NIBBLING CUTOUTS BY ROTATION OF TOOLING WITH CUTTING SURFACES OF DIFFERENT CONTOURS AND TOOLING THEREFOR

[75] Inventor: Rudi Kuppinger, Schoenaich, Fed. Rep. of Germany

[73] Assignee: Trumpf GmbH & Co., Ditzingen, Fed. Rep. of Germany

[21] Appl. No.: 661,381

[22] Filed: Oct. 16, 1984

[51] Int. Cl.$^4$ .............................................. B26D 5/20
[52] U.S. Cl. ........................................ 83/49; 83/373; 83/559; 83/561; 83/685; 83/689; 83/916
[58] Field of Search ................... 83/49, 916, 373, 559, 83/560, 561, 562, 684, 685, 689

[56] References Cited

U.S. PATENT DOCUMENTS

| | | | |
|---|---|---|---|
| 364,262 | 6/1887 | Kittredge | 83/916 |
| 1,958,941 | 5/1934 | Chapman | 83/916 |
| 2,088,202 | 7/1937 | Gray | 83/573 |
| 2,365,977 | 12/1944 | Stine et al. | 83/685 |
| 2,650,663 | 9/1953 | Wales et al. | 83/916 |
| 3,269,240 | 8/1966 | Killaly et al. | 83/916 |
| 4,412,469 | 11/1983 | Hirata et al. | 83/556 |

FOREIGN PATENT DOCUMENTS

| 358440 | 3/1930 | United Kingdom | 83/916 |
|---|---|---|---|
| 665777 | 1/1952 | United Kingdom | 83/916 |

*Primary Examiner*—Frank T. Yost
*Assistant Examiner*—Hien H. Phan

[57] ABSTRACT

A punch press has a punch support and die support which are rotatable about a common vertical axis, and a drive mechanism for rotating and effecting the reorientation of the tooling relative to the X and Y axes of the punch press. In this fashion, rotation of the tooling will enable reorientation of a single cutting surface, and location of various of the distinctly contoured cutting surfaces, at the desired cutting position to effect cutouts of different contour or angular orientation in a workpiece relative to the X and Y axes. The punch has a cutting portion which is of a cross section providing at least two cutting surfaces of different contours with at least at least two arcuate cutting surfaces. In accordance with one embodiment, the punch is desirably of elongated cross section with a length L along its elongated axis and a width W in its transverse axis which is less than $\frac{1}{2}$ L. Movement of the sheet material along the X and Y axes together with such rotation of the tooling enables relatively smooth configurations to be nibbled with a single set, or limited number of sets, of tooling.

15 Claims, 22 Drawing Figures

METHOD AND APPARATUS FOR NIBBLING CUTOUTS BY ROTATION OF TOOLING WITH CUTTING SURFACES OF DIFFERENT CONTOURS AND TOOLING THEREFOR

BACKGROUND OF THE INVENTION

As is well known, punch presses are highly useful for producing various types of cutouts in sheet-like workpieces of metal, plastic, composite materials and the like. In recent years, numerically controlled punch presses have enabled the production of relatively complex cutouts by repetitive punch strokes in nibbling operations, because movement of a workpiece clamping mechanism may be controlled by an X-Y coordinate guidance system.

Moreover, with the advent of large turret assemblies in turret-type punch presses and with the later advent of automatic tool changer type punch presses, a fairly large amount of tooling may be provided within the press so that the operative punch and die may be readily changed. Thus, even complex configurations have been made possible through the optimization of computer numerically controlled systems in presses providing a multiplicity of interchangeable tools.

However, the configuration of cutouts that could be obtained by a punch press still has been dictated by the specific tooling available for operation without changing the tools in the turrets or in the tool changer carriers, and it has generally been necessary to change the tooling in the operative ram position in order to effect any modification in the cutout being produced. More recently in Hirata et al. U.S. Pat. No. 4,412,469 granted Nov. 1, 1983, it has been proposed to provide additional variation in the nature of the cutouts produced by a single set of tooling by providing a rotatable set of tooling in a turret-type punch press. More particularly, at two diametrically spaced positions in the turrets, there has been provided tooling which can be rotated by a pair of servomotors. As a result, rotation of the tooling may be coupled with the indexing of the workpiece to spaced positions to produce cutouts with the tooling rotated relative to the X and Y axes of movement of the workpiece so that the cutouts are at different angular relationships.

Even more recently, there has been introduced a tool changer type punch press in which the punch is rigidly coupled to the lower portion of the ram assembly so as to move integrally therewith and to provide a mechanism which effects rotation of the lower portion of the ram assembly and thereby the punch. Moreover, the die is firmly held in a die holder assembly which is rotated simultaneously with the lower portion of the ram assembly by the same drive mechanism. This punch press is illustrated and described in the copending application of Hans Klingel entitled "Punch Press With Rotary Ram And Method Of Operating Same", Ser. No. 661,399 filed Oct. 16, 1984.

The availability of such rotary action for the punch press tooling provided by these two rotary action presses has thus increased the versatility of a single set of tooling.

In nibbling or contouring operations, the punch tooling repetitively acts upon the workpiece as it is moved relative to the punching station to produce a series of overlapping cutouts which ultimately define a large contoured cutout, and this may have rectilinear and/or curvilinear edges. Generally, the tooling for such nibbling operations has utilized a relatively small diameter, generally cylindrical cutting portion on the punch and a cooperatively configured die, although polygonal cross section punches are also used. As is well known, the size of the punch that may be utilized is limited by the punching force generatable by the punch press, the thickness of the sheet material comprising the workpiece and the shear strength of the material comprising the workpiece. Moreover, the feed rate or rate at which the sheet material is indexed to form the contoured edge on the workpiece will depend upon the amount of overlap of adjacent punch strokes which, in turn, is often dictated by the amount of roughness tolerable in the contoured edge.

As will be appreciated, nibbling of a straight line with a circular punch will produce an edge defined by a series of arcs and the roughness will be dependent upon the feed rate per stroke as seen in FIG. 18a, where E represents the lineal advance of the workpiece or feed rate, $D_n$=diameter of the nibbling tool, and $R_t$=roughness or the width of the sector defined by the intersecting arcs of the adjacent punch cutouts.

The feed rate E for a straight edge is usually controlled to limit $R_t$ to 0.2–0.4 mm, determined in accordance with the following formula:

$$E = \sqrt{4 \cdot D_n \cdot R_t - R_t^2} \sim 2\sqrt{D_n \cdot R_t}$$

If the allowable roughness is greater and the diameter of the punch can be greater, then the feed rate E can be increased to produce the nibbled cutout faster.

Similarly, if a curved edge is to be nibbled, the feed rate is also dependent upon the amount of roughness as seen in FIG. 18b, where E=represents the lineal advance of the workpiece between strokes, $R_z$=the radius of the punch, $R_s$=the radius of the curve for the cutout, and $R_t$=roughness or the length of the sector defined by the intersecting arcs of the adjacent cutouts. The comparable formula is as follows:

$$E \sim \sqrt{4 \cdot D_n \cdot R_t} \cdot \sqrt{1 + \frac{D_n}{2R_s - D_n}} \text{ or}$$

$$E \sim \sqrt{8 \cdot R_z \cdot R_t} \cdot \sqrt{1 + \frac{R_z}{R_s - R_z}}$$

By use of a punch with an arcuate cutting face having the same radius as that of the desired curve for the cutout, the roughness produced by the nibbling can be eliminated. However, in almost all instances this would require a circular punch with a very large diameter and in turn requiring more power than the press has available to punch through the workpiece.

The force to cut through the workpiece with a circular punch is, for a single stroke cutout, determined in accordance with the formula:

$$F = D_s \cdot \pi \cdot S \cdot T_s$$

where $D_s$ is the diameter of the punch, S is the thickness of the sheet material, and $T_s$ is the shear strength of the sheet material. For the force required using a rectangular punch, the formula is:

$$F = (2L + 2W) \cdot S \cdot T_s$$

where L and W are the length and width of the punch cross section. It can be seen that the force required can rapidly reach and exceed the capacity of the press as thicker materials are employed.

A further factor that must be considered in punch design is that the width of the punch must be at least as great as, and preferably greater than, the thickness of the sheet material. If not, the punch is subject to breakage. Moreover, polygonal punches wear more rapidly in cutting sheet material than does a tool of circular cross section, and this is particularly significant as thicker sheet material is being punched.

It is an object of the present invention to provide a novel punching method for nibbling contoured cutouts in workpieces at a relatively rapid rate with one set, or a limited number of sets, of tooling.

It is also an object to provide such a method in which the tooling will generate contoured edges with relatively low roughness.

Another object is to provide a novel punch press assembly for nibbling contoured cutouts in workpieces at a rapid rate and which includes means for effecting rotation of the tooling and indexing of the workpiece along X and Y axes.

A further object is to provide novel punch tooling for rapidly nibbling contoured cutouts in a workpiece with one set or a limited number of sets, of tooling when used in a punch press which will effect rotation of such tooling and precise indexing of the workpiece.

SUMMARY OF THE INVENTION

It has now been found that the foregoing and related objects may be readily attained by a method of nibbling contoured cutouts in a sheet-like workpiece in which there is provided a punch press having a frame with a base and a head spaced thereabove, a ram assembly in the head including a lower portion reciprocatable along a vertical axis relative to the base of the punch press frame. A punch is located in alignment with the ram lower portion for reciprocation thereby, and it has a cutting portion of a cross section providing at least two cutting surfaces $A^1$ and $A^2$ of different contour, at least the surface $A^1$ being arcuate and defined by the radius $R^1$. A die is located in alignment with the punch, and it has an aperture cooperatively dimensioned and configured to receive the cutting portion of the punch.

A sheet-like workpiece is supported between the die and punch, and the ram lower portion is reciprocated to drive the punch through the workpiece to produce a cutout. The workpiece is then indexed in a horizontal plane a predetermined distance relative to the vertical axis of reciprocation of the punch with the distance being not greater than the length of the punch cutting surface. The punch and die are rotated a predetermined amount to orient the desired one of the cutting surfaces at the cooperating angular position for the desired contour of the cutout in the workpiece; and the ram portion is reciprocated to drive the punch through the workpiece to produce a second cutout contiguous to the first cutout. These indexing, rotating and reciprocating steps are repeated to produce a large contoured cutout, with at least some of the rotation steps involving the presentation of cutting surfaces of different contours at the operative contouring position. As a result, the angular orientation of a cutting surface may be varied to approximate closely the desired contour of the cutout and cutting surfaces of different contour may be rotated into the contouring position.

Desirably, the punch cutting portion provides at least three cutting surfaces $A^1$, $A^2$ and $A^3$ of different contours. In one embodiment, the cutting portion is of elongated cross section with a length L and a width W along the axis perpendicular thereto which is less than $\frac{1}{2}L$. Both surfaces $A^1$ and $A^2$ may be arcuate with the radius $R^2$ defining the surface $A^2$ being the same as, less than, or greater than the radius $R^1$. The cross section of the cutting portion may be concavo-convex with the surface $A^1$ being convex and the surface $A^2$ being concave. The ends of the surfaces $A^1$ and $A^2$ may be spaced apart and blend into convex arcuate surfaces $A^3$ and $A^4$ defined by radii $R^3$ and $R^4$ respectively.

More particularly, the punch press includes a frame providing a base and a head spaced thereabove, and a ram assembly mounted on the head of the frame with a lower portion reciprocatable for movement along a vertical axis towards and away from the base. First drive means is provided for reciprocating the lower portion of the ram assembly.

The assembly further includes a punch as heretofore defined, and support means supporting the punch for reciprocation with the reciprocatable portion of the ram assembly. Also included is a die having an aperture therein cooperatively dimensioned and configured to receive the cutting portion of the punch, and means supporting the die in alignment with the punch.

Second drive means is provided for effecting equivalent rotation of the punch and die about a common vertical axis, and a work support table is supported on the frame and extends about the die for supporting an associated workpiece thereon. Workpiece clamping and moving means is supported on the frame for controlled movement of the associated workpiece along X and Y axes relative to the vertical axis defined by the axis of rotation of the punch and die. This workpiece clamping and moving is movable along such axes by third drive means.

Control means controls the operation of the first drive means to effect reciprocation of the ram lower portion and the second drive means to effect rotation of the punch and die when the ram portion is spaced above the die. It also controls the third drive means for the workpiece clamping and moving means to effect precise indexing of the associated workpiece between strokes of the ram assembly to produce contiguous cutouts therein.

The preferred punch press is one in which coupling means is provided on the lower portion of the ram assembly which engages the punch on the lower end of the reciprocable ram portion to mount it securely thereon. The die is securely seated in a die holder rotatably supported on the base for rotation about an axis coaxial with that of the ram assembly lower portion and in alignment with the punch. The ram lower portion and die holder are rotated by rotational means which includes a first member driven by the second drive means, and a pair of vertically spaced, generally horizontally extending members movably supported on the frame. The horizontally extending members have first end portions drivingly engaged with the first member and opposite end portions drivingly engaged with the ram lower portion and die holder to effect simultaneous rotation thereof about the vertical axis. Preferably, the rotational means comprises intermeshing gear surfaces on the first and horizontally extending members and on the die holder and ram lower portion. The rotational means is actuatable by the second drive means in both directions of rotation to effect rotation of the ram lower portion and die holder in either direction of rotation.

If so desired, a second punch and second die of a configuration distinct from that of the first mentioned punch and die may be substituted, and the indexing, reciprocating steps repeated to provide a cutout of a configuration different from that produced by the first mentioned punch and die.

DETAILED DESCRIPTION OF THE ILLUSTRATED EMBODIMENTS

Figure 1:
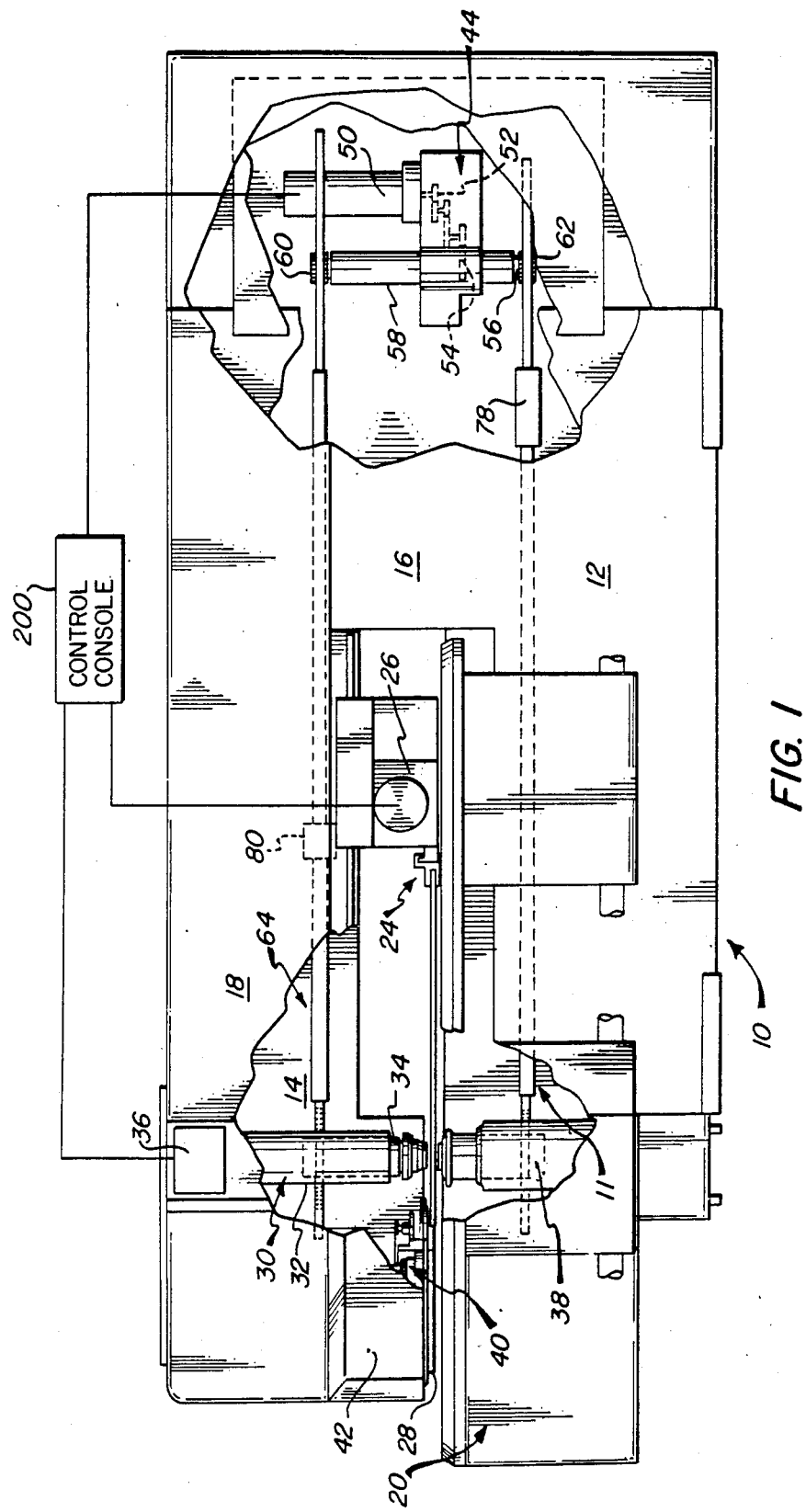
FIG. 1 is a partially diagrammatical side elevational view of an automatic tool changer type punch press embodying the present invention with portions broken away to reveal internal construction.

Turning in detail first to FIG. 1 of the attached drawings, therein illustrated is an automatic tool changer punch press embodying the present invention which has a C-shaped frame generally designated by the numeral 10 providing a base 12, a head 14 extending in spaced relationship thereabove, and a vertically extending web or center section 16 at the rear thereof. Sheet metal covers 18 are mounted along the sides and front and rear thereof to enclose various elements of the structure and mechanical, electrical and hydraulic components for safety and aesthetic considerations.

A worktable generally designated by the numeral 20 is supported on the base 12. A workpiece clamping and indexing assembly generally designated by the numeral 24 is supported on the base 12 of the frame 10 adjacent the center section 16, and is movable along X and Y axes relative to the table 20 by drive mechanisms including that in the drive housing 26. In this fashion, the workpiece 28 may be moved in X and Y directions on the table 20 under the head 14.

Mounted on the forward end of the head 14 of the frame 10 is a ram assembly generally designated by the numeral 30 and including an upper portion 32 and a lower portion 34. The drive mechanism for reciprocating the lower portion 34 of the ram assembly 30 is located in the upper portion of the ram assembly 30 and is diagrammatically illustrated by the numeral 36. Mounted on the base 12 of the frame 10 is a die holder assembly generally designated by the numeral 38. An automatic tool changer mechanism generally designated by the numeral 40 is disposed within the tool changer housing 42 at the front of the press.

In accordance with the present invention, the press includes a rotational assembly, generally designated by the numeral 44, for rotating the lower portion 34 of the ram assembly 30 and the die holder assembly 38. This includes a bi-directional motor 50 having a shaft on which is mounted the first of a series of gears in the gear train 52, which transmits the rotational output of the motor 50 to a pinion gear 54 mounted on the vertical shaft 56 intermediate its length. The shaft 56 is rotatably supported in the support member 58 and has pinion gears 60, 62 at its upper and lower ends.

Figure 2:
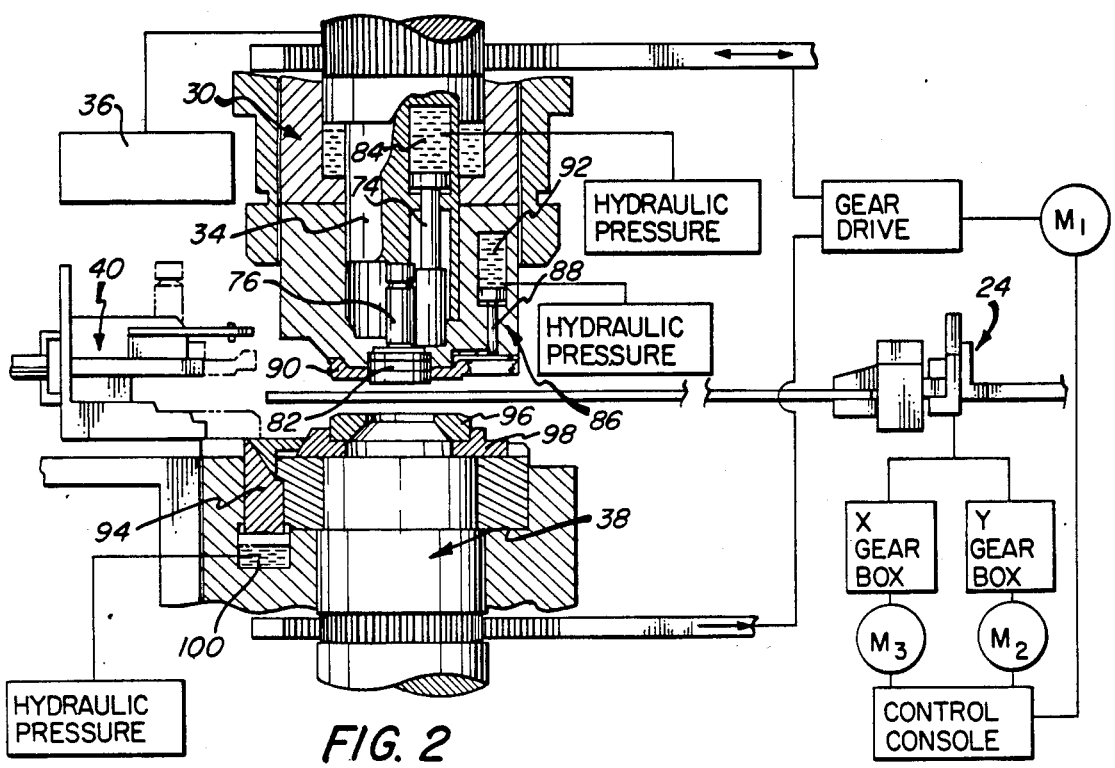
FIG. 2 is a partially diagrammatical, fragmentary side elevational view to an enlarged scale of the lower portion of ram assembly and upper portion of the die holder assembly with portions broken away to reveal internal construction, and also showing the automatic tool changer and workpiece clamping and guidance mechanisms and the gears for rotating the ram and die holder assemblies.

The pinion gears 60, 62 in turn mesh with rack gears 63 on the elongated horizontal members generally designated by the numerals 64, 66 which are slidably supported on guides 80 at spaced points along the length of the frame 10 for horizontal movement in either direction. The lower horizontal member 66 includes a threadably adjustable coupling 78 to permit adjustment of the overall length thereof. As best seen in FIG. 2, at their opposite ends the horizontal members 64, 66 have rack gears 63 which mesh with pinion gears 70, 72 on the periphery of the ram lower portion 34 and die holder assembly 38.

Turning now in detail to FIG. 2, the lower portion 34 of the ram assembly 30 has a hydraulic mechanism 74 which will clamp the stem 76 of the punch generally designated by the numeral 82 upon the introduction of pressurized hydraulic fluid to the chamber 84. The stripper holder assembly is generally designated by the numeral 86 and includes a hydraulic mechanism 88 for clamping the stripper 90 upon introduction of pressurized hydraulic fluid to the chamber 92. The die holder assembly 38 also has a hydraulic clamping mechanism 94 for clamping the die 96 in the die holder block 98 upon introduction of pressurized hydraulic fluid into the chamber 100. Diagrammatically shown is the drive mechanism 34 for the ram assembly which may be a mechanical type using a crankshaft or eccentric to drive the ram assembly 30 and thereby to reciprocate the lower portion 34, or a hydraulic type in which the upper portion 32 is a cylinder in which reciprocates the upper end of the lower portion 34.

Figure 3:
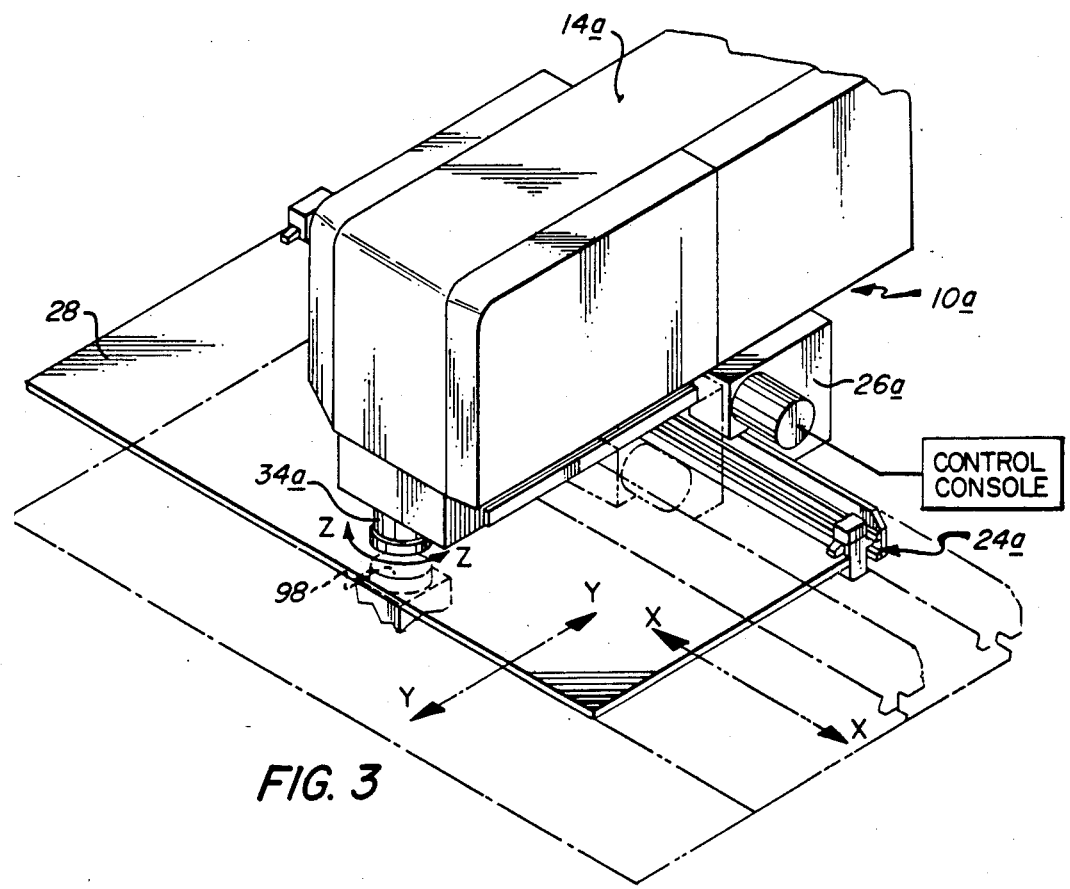
FIG. 3 is a partially diagrammatic and fragmentary perspective view of a manual tool changer type punch press with a workpiece on the worktable showing movement of the workpiece along X and Y axes by the workpiece clamping and guidance system.
Figure 4:
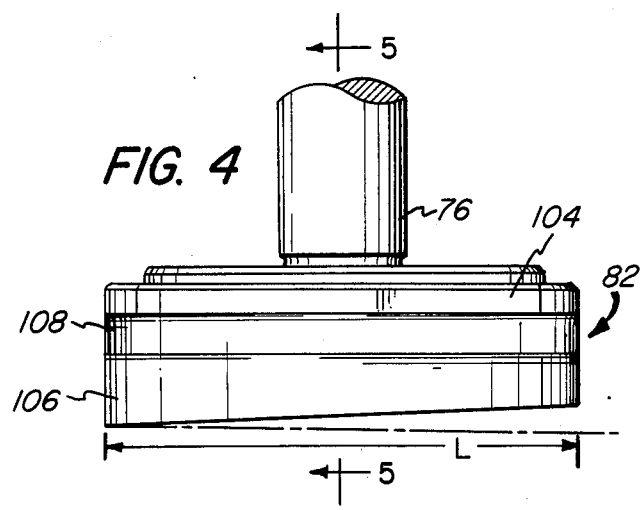
FIG. 4 is a fragmentary side elevational view of a novel punch for use in the punch press assemblies of the present invention.
Figure 5:
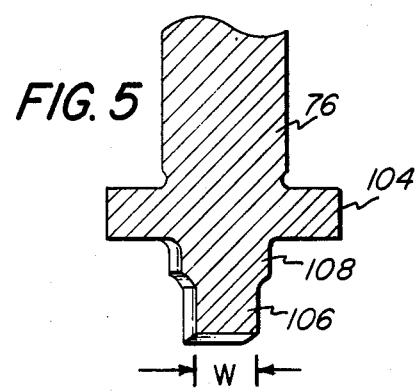
FIG. 5 is a sectional view of the punch of FIG. 4 along the line 5—5 of FIG. 4.
Figure 6:
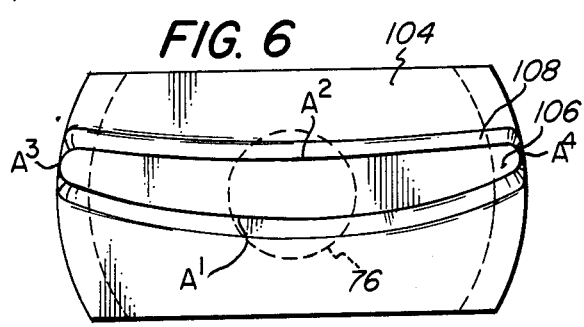
FIG. 6 is a bottom view of the punch of FIGS. 4 and 5.

In FIG. 3, there is fragmentarily illustrated a semi-automatic tool changer type punch press showing the head 14a of the frame 10a and the workpiece clamping mechanism 24a and one of its drive housings 26a. Between the lower portion 34a of the ram assembly and the die holder block 98 of the die holder assembly, is disposed a sheet-like workpiece 28 shown in phantom and solid line in several indexed positions resulting from movement of the clamping mechanism 24a into several indexed positions thereof also shown in phantom line and in solid line. The bi-directional rotation of the lower portion 34a of the ram assembly is indicated by the bi-directional arrow. In this type of press, the tooling is quickly changed in the ram assembly and in the die holder by manually operable tool cartridges.

Turning now to FIGS. 4–7, therein illustrated a cooperating punch and die set for the apparatus and method of the present invention. The punch 82 has a stem 76 which is clamped in the ram assembly 30, a body 104, a cutting portion 106 and an intermediate portion 108. The cutting portion 106 is of elongated concavo-convex cross section with a length L and tapers to a reduced height at one end. The width W at its center is about $\frac{1}{8}$L, and its principal side surfaces $A^1$ and $A^2$ are arcuate and defined by radii $R^1$ and $R^2$ respectively, $R^2$ being greater than $R^1$. The ends of the arcuate side surfaces $A^1$ and $A^2$ blend into convexly arcuate side surfaces $A^3$ and $A^4$ defined by much shorter radii $R^3$ and $R^4$ which are substantially equal to each other. The resultant configuration approximates that of a banana, with three different contours for the four available cutting surfaces. The cutting portion 106 can be seen to traverse the entire width of the punch body portion 104 so that the arcuate end surfaces $A^3$ and $A^4$ have a portion which is substantially coincident with its periphery. The die 96 has an aperture 110 therein cooperatively dimensioned and configured to closely receive the cutting portion 106 of the punch 82.

Figure 8:
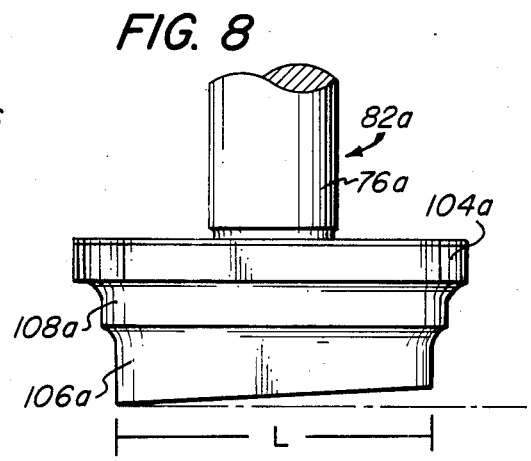
FIG. 8 is a fragmentary side elevational view of another embodiment of a punch for the assemblies of the present invention.
Figure 7:
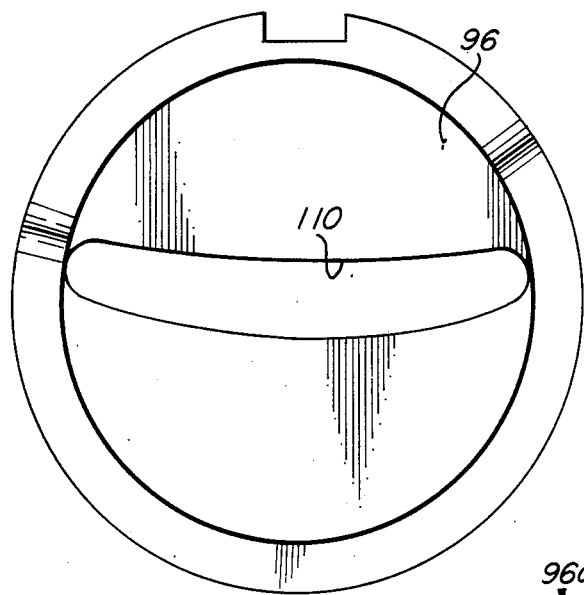
FIG. 7 is a plan view of the die used in combination with the punch of FIGS. 4–6.
Figure 9:
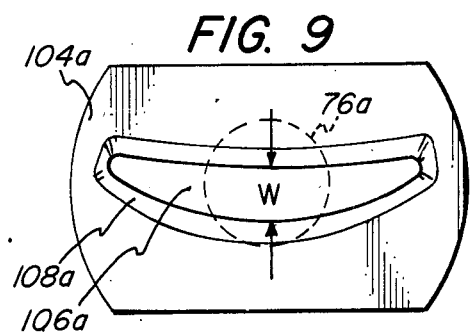
FIG. 9 is a bottom view of the punch of FIG. 8.
Figure 10:
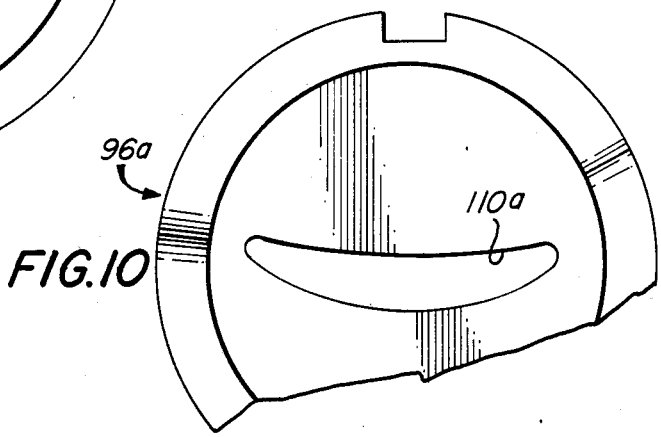
FIG. 10 is fragmentary plan view of the die used in combination with the punch of FIGS. 8 and 9.

The tooling of FIGS. 8–10 is similar in concavo-convex configuration but of different dimensions; the punch cutting portion 106a is of lesser length although still elongated with its length L being about 6 times its width. The die 96a has its aperture 110a cooperatively dimensioned and configured to receive closely the cutting portion 106a.

Figure 11:
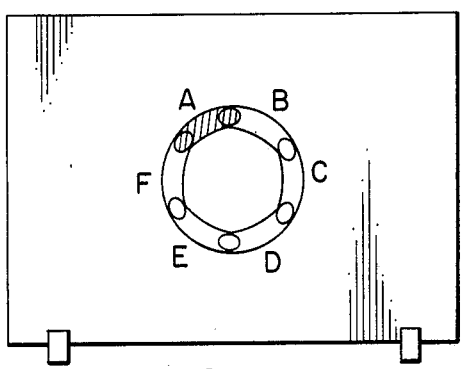
FIG. 11 is a diagrammatic view of a workpiece in which a circular cutout is contoured or nibbled by a series of strokes in accordance with the present invention.

Turning now to FIG. 11, therein illustrated a workpiece 28 with a generally circular contoured cutout 112 which is formed by a series of six punch strokes using the punch and die set of FIGS. 4–7 with the overlapping cutouts produced by each stroke being indicated by the letters A–F.

Figure 12:
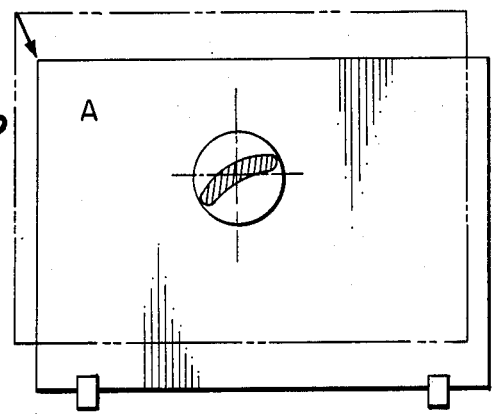
FIGS. 12–17 are diagrammatic views showing the successive strokes and indexing of the workpiece to produce the contoured cutout of FIG. 11.
Figure 13:
Figure 14:
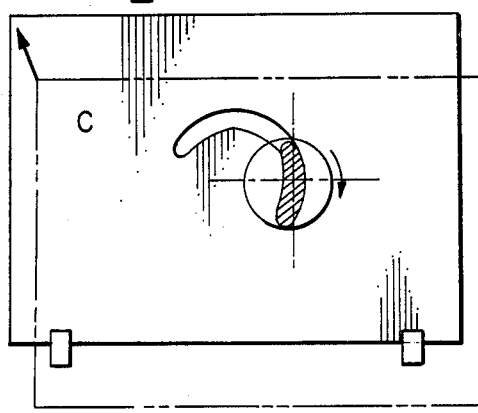

As seen in FIG. 12, the workpiece 28 is indexed in both X and Y axes from an initial position shown in phantom line by the clamping and transport mechanism 24a and the first punch stroke produces an arcuate cutout A. In FIG. 13, the workpiece 28 is indexed to the left along the X axis and the punch and die have been rotated 60° and the end of the punch overlaps the end of the cutout A; the punch stroke then produces an arcuate cutout B. In FIG. 14, the workpiece 28 is indexed along both X and Y axes, and the tooling rotated an additional 60°; the resultant punch stroke produces the overlapping cutout C.

Figure 15:
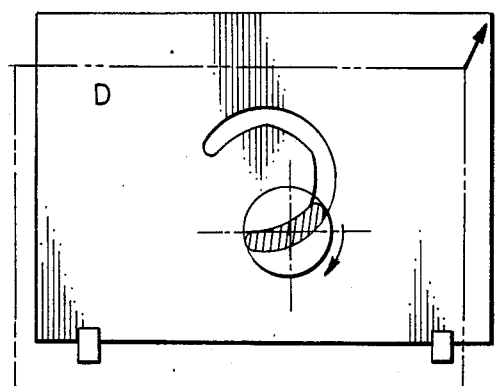
Figure 16:
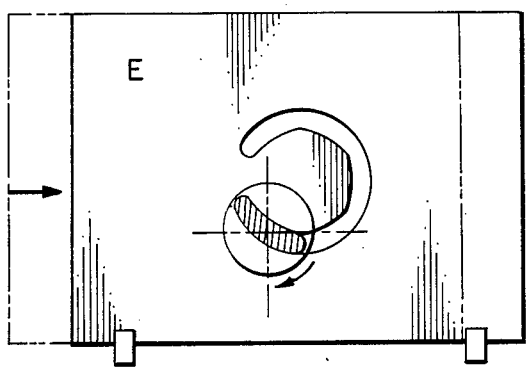
Figure 17:
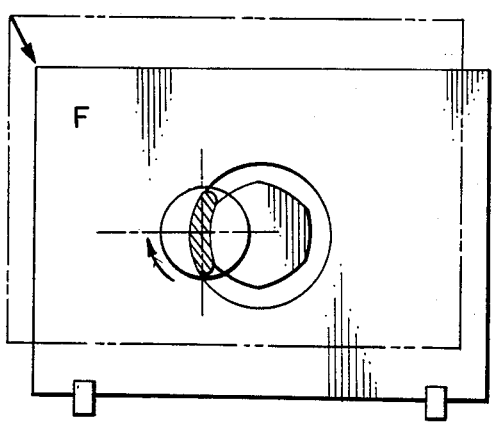
Figure 18B:
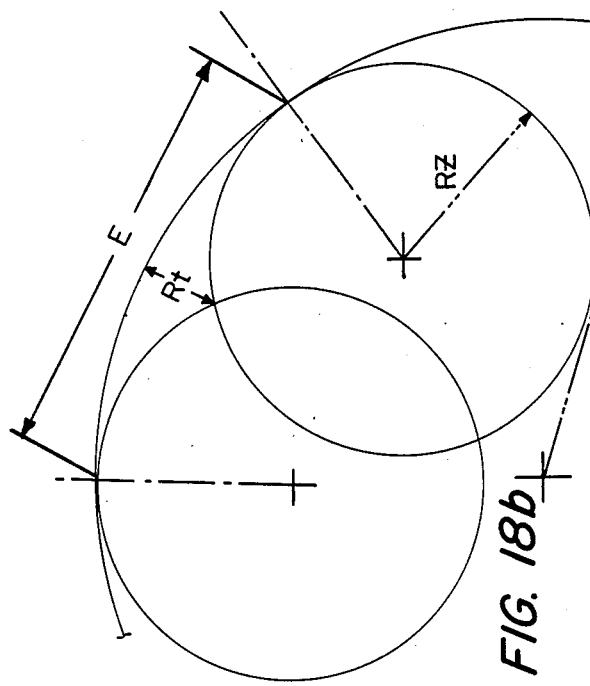
FIG. 18b is a similar view where the punch is nibbling a curvilinear edge.
Figure 18A:
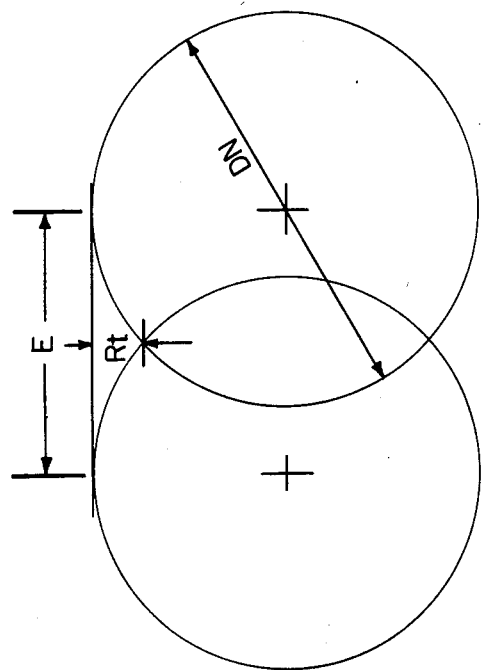
FIG. 18a is a diagrammatic view of a pair of punch strokes using a circular punch to nibble a rectilinear edge.

In FIG. 15, the workpiece 28 has been indexed in both X and Y axes and the tooling rotated an additional 60°; the punch stroke produces the arcuate cutout D. In FIG. 16, the workpiece 28 has been indexed in the X direction and the tooling rotated 60°; the punch stroke produces the arcuate cutout E. In FIG. 17, the workpiece has been indexed along both X and Y axes and the tooling rotated an additional 60°; the punch stroke produces the arcuate cutout F to complete a circular contoured cutout with a relatively smooth edge.

In this instance, the tooling has been selected so that the radius of the arcuate surface $A^1$ is equal to the radius of the desired circular cutout and the length of the arcuate $A^1$ surface is greater than a 60° sector to permit overlapping of the ends of the cutouts.

In the apparatus and method of present invention, the novel configuration of the tooling provides cutting surfaces of different contours which may closely conform to the desired contour of the cutout. Use of the illustrated tooling embodiments with the elongated curvilinear cross section enables the elongation of the effective length of the periphery providing the contoured edge.

In accordance with conventional constriction, the control console 200 seen in FIGS. 1-3 contains control programs to effect automatic operation of the punch press. In the present invention, the program generates signals to effect automatic operation of the workpiece clamping and indexing assembly 24 to the workpiece 28 along the X and Y axes, to reciprocate the ram assembly 30, to rotate the ram assembly 30, and to change the punch and die tooling as required. Thus, in nibbling a contoured cutout, programs provided therein produce signals to index the workpiece, reciprocate the ram assembly, and rotate the ram assembly concurrently with signals effecting the indexing of the workpiece a distance not greater than the length of the operative punch cutting edge surface. At least some of the signals orient different cutting edge surfaces of the punch and die in the operative position, and other signals orient the same cutting edge surface at a different angular orientation relative to the X and Y axes of the machine.

Figure 19C:
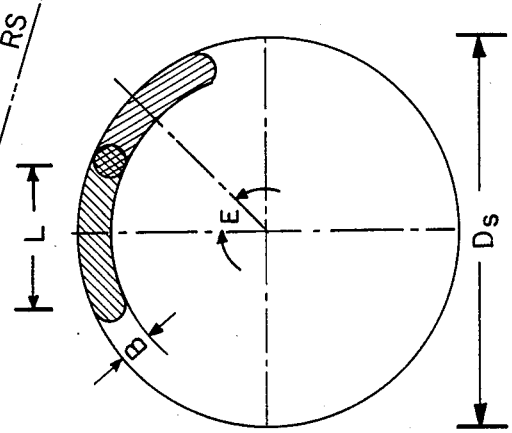
FIG. 19c is a diagrammatic view of the intended cutout superimposed with overlapping cutouts produced in accordance with the present invention.

Illustrative of the advantages of the present invention is the following analysis. To produce the circular cutout seen in FIG. 19a with a punch of the same diameter would require a punching force determined in accordance with the formula:

$$F = D_s \cdot \pi \cdot S \cdot T_s$$

where $D_s$ = diameter of the desired cutout, $S$ = thickness of the workpiece and $T_s$ equals the shear strength of the workpiece material. If the diameter ($D_s$) of the desired cutout is 600 mm, the thickness of the sheet material is 2.5 mm and its shear strength is 320 Newtons/mm$^2$, the force required is 150 metric tons. Of course, the roughness ($R_t$) is 0.

Figure 19B:
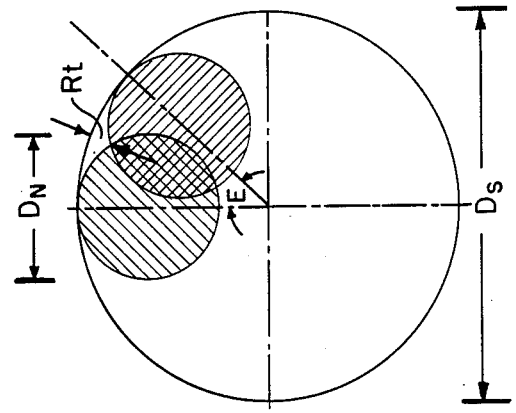
FIG. 19b is a similar diagrammatic view of the intended cutout with a pair of overlapped circular cutouts superimposed thereon.
Figure 19A:
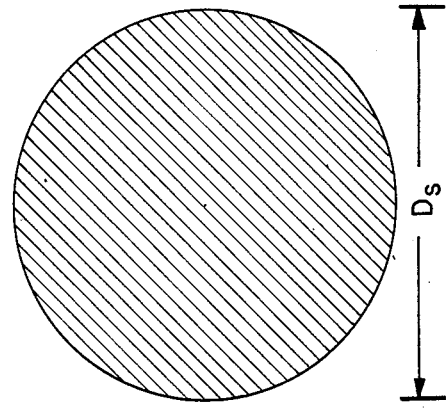
FIG. 19a is a diagrammatic view of a circular cutout.

In accordance with common practice, a circular punch of lesser diameter is conventionally employed with the punch strokes overlapping to produce arcuate sectors (or roughness) $R_t$ as seen in FIG. 19b. As indicated before, the feed rate determines the roughness, and the tolerable roughness will thus determine the feed rate. Generally, the feed rate to produce an acceptable overlap and resultant roughness will be on the order of 3–5 millimeters. Thus, the nibbling force required for the second and subsequent strokes would be determined in accordance with the formula:

$$F = \lambda \cdot D_n \cdot \pi \cdot S \cdot T_s$$

where λ is determined by the amount of overlap and varies between 0.5 and 1.0. Assuming a punch of 50 mm. diameter ($D_n$) and an overlap (distance between centers) of 6.5 mm., the force required will be 12.6 metric tons for the initial stroke, and 285 strokes will be required to produce the desired cutout.

The roughness is determined by the formula:

$$R_t = \frac{D_s}{D_n} \cdot (D_s - D_n) \cdot \frac{1 - \cos E/2}{2 \cos E/2}$$

By combining the punch tooling of the present invention and rotation of the ram and die holder assemblies to rotate that tooling, the benefits of the present invention can be readily determined by referred to FIG. 19c and the formula:

$$F = (2L + B \cdot \pi) \cdot S \cdot T_s$$

where L=the lineal length of the arcuate cutting surface of the punch between its reversely curved ends, and B=the cross sectional width of the punch, and E=the arc defined by the radii to the center of the punch in adjacent strokes.

For tooling of the type illustrated in FIGS. 4–10 with L=50 mm, a radius ($R_1$) of 300 mm., and a cross sectional width (B) of 5 mm, and a radial feed rate (E) of 9.5°, the force required is 9.3 metric tons for the initial stroke, and 38 strokes will provide the full contoured cutout. The roughness will be 0.

Thus, while conventional nibbling with a circular punch will reduce the force required from 16 to 1.35 metric tons from that for a circular punch of the desired radius, it will require 285 strokes and produce a rough edge. The method of the present invention enables the reduction of the force to 1 metric ton use only 38 strokes and produce a smooth edge.

Although the preferred punch presses will be of the type illustrated herein where the punch and die are firmly secured to the ram assembly and in the die holder, may also be turret presses of the type described in the aforementioned Hirata et al U.S. Pat. No. 4,412,469 wherein the tooling is rotated in the turrets. However, such turret presses generally provide less accuracy in control of the punch movement and the opportunity for greater wear on the tooling and some misalignment between the adjacent cutouts produced by subsequent strokes.

In the foregoing example and in the accompanying drawings illustrating the method and tooling of the present invention, a cutout in the workpiece of circular configuration has been assumed. However, other curvilinear configurations may also be rapidly and smoothly cut by use of tooling with different arcuate contours or by use of tooling providing the desired cutting surfaces of different contours, and rotating the tooling to dispose the desired cutting surface in the operative position.

Thus, the tooling may have the concavo-convex, banana-like configuration specifically illustrated, or both elongated arcuate surfaces may be concave or convex, or various other combinations of different contours. The tooling configuration will depend upon the nature of the curve to be cut and whether the desired contoured surface is to be formed by the inside or outside edge of the punch during the punch stroke. Moreover, a large radius arcuate surface may be utilized to nibble a rectilinear surface portion of a polygonal cutout.

In the elongated punch tooling of the illustrated embodiments, the width W of the punch cutting portion is substantially less than the length L. Although any reduction of more than ½ will provide beneficial results, the width is preferably not more than ¼, and desirably not more than 1/6, the length of the cutting portion.

Reference may be made to Herb et al, U.S. Pat. No. 4,274,801 granted on June 23, 1981 for further description of X-Y guidance systems for the workpiece.

For detailed descriptions of suitable tool changer mechanisms, reference may be made to Herb, U.S. Pat. No. 3,816,904 granted June 18, 1974; and Herb et al, U.S. Pat. No. 4,103,414 granted Aug. 1, 1978.

References may be made to the aforementioned copending Klingel U.S. application Ser. No. 661,399 filed Oct. 16, 1984 entitled "Punch Press with Rotary Ram and Method of Operating Same" for greater details on the preferred punch press structures utilizing drive means for rotating the tooling mounted on the ram assembly and in the die holder. The punch press of the Klingel application affords excellent control of the punching operation and the opportunity to minimize tool wear due to the fact that the punch and die are rigidly supported on the ram assembly and in the die holder assembly. The gear drive mechanism provides a relatively rugged assembly with precise control over the amount of rotation, and the rotation is simultaneously effected by the common drive mechanism. In the automatic tool changer embodiment, all tooling is readily available for use on the relatively rotatable ram and die holder members so as to afford a high degree of versatility and rapid tool change.

As indicated previously, although the punch press mechanism illustrated herein is of the mechanical drive type using a crank shaft, it should be readily appreciated that the present invention is also readily employable in connection with punch presses using hydraulic means to effect reciprocation of the lower portion of the ram assembly. In such presses, the upper portion of the ram assembly generally comprises a cylinder into which highly pressured hydraulic fluid is introduced to reciprocate the lower portion of the ram assembly which carries the punch. In such presses, a pinion gear ring is provided about the lower portion of the ram assembly and the housing thereabout provides clearance for the pinion gear to move axially therewithin.

Thus, it can be seen from the foregoing detailed specification and attached drawings that the nibbling or contouring method of the present invention is readily able to produce cutouts of various contours and varying contours with a single set, or a limited number of sets, of tooling. The method is reliable and economical and provides a high degree of versatility.

The punch press assembly is one which is rugged and which provides secure engagement of novel punch and tooling die and precisely controlled simultaneous rotation thereof to permit precision nibbling or contouring of the workpiece. By proper selection of the tooling, smooth curvilinear cutouts can be readily attained, and improved polygonal cutouts can also be attained. The programmed indexing of the workpiece coupled with programmed rotation of the ram assembly with the elongated punch tooling and of the die holder permits highly effective and rapid punching and contouring of smooth curvilinear cutouts of relatively large configu-

Having thus described the invention, what is claimed is:

1. In a method for nibbling contoured cutouts in a sheet-like workpiece, the steps comprising:
   (a) providing a punch press having a frame with a base and a head spaced thereabove, a ram assembly on the head including a lower portion reciprocatable along a vertical axis relative to the base of said punch press frame;
   (b) locating a punch in alignment with said ram lower portion for reciprocation thereby along said vertical axis, said punch having a cutting edge portion extending across its lower end in a common plane and including at least two cutting edge surfaces $A^1$ and $A^2$ of different contour, the cutting surface $A^1$ being arcuate and defined by the radius $R^1$ and the cutting surface $A^2$ being arcuate and defined by the radius $R^2$, said arcuate surfaces $A^1$ and $A^2$ being non-parallel;
   (c) locating in alignment with said punch a die having an aperture cooperatively dimensioned and configured to receive said cutting edge portion of said punch, said punch and die defining a workstation therebetween substantially in alignment with said vertical axis of said ram assembly lower portion;
   (d) supporting a sheet-like workpiece at said workstation between said die and punch;
   (e) reciprocating said ram portion to reciprocate and drive said cutting edge portion of said punch through said workpiece at said workstation to produce a cutout;
   (f) indexing said workpiece in a horizontal plane a predetermined distance relative said workstation, said distance being not greater than the length of a first one of said punch cutting edge surfaces;
   (g) rotating said punch and die at said workstation substantially at and about said vertical axis a predetermined amount to orient a desired one of said cutting edge surfaces at the desired angular position for the desired contour of a large contoured cutout in said workpiece;
   (h) reciprocating said ram portion to drive said cutting edge portion of said punch through said workpiece at said workstation to produce a second cutout contiguous to said first cutout; and
   (i) repeating steps (f)–(h) to produce a large contoured cutout, at least some of said rotation steps effecting rotation of said punch and die substantially at and about said vertical axis to orient another one of said cutting edge surfaces at the desired angular position for the desired contour of the large contoured cutout in said workpiece and at least some of said rotation steps consecutively effecting rotation of said punch and die substantially in and about said vertical axis to orient the same cutting edge surface at the desired angular position for that portion of the desired contour of the large contoured cutout in said workpiece, thereby defining said contour of said large contoured cutout by at least said two cutting surfaces.

2. The method in accordance with claim 1 wherein said cutting edge portion of said punch provides at least three cutting ege surfaces $A^1$, $A^2$ and $A^3$ of different contour and wherein said rotation steps effect rotation of each of said cutting surfaces $A^1$, $A^2$ and $A^3$ into the desired angular position for a portion of the desired contour of the large cutout in said workpiece, thereby defining said contour of said cutout by said three cutting surfaces $A^1$, $A^2$ and $A^3$.

3. The method in accordance with claim 1 wherein said cutting edge portion is elongated to provide an elongated cross section in said plane with a length L along an axis in the plane of the cutting edge surfaces extending in the direction of elongation and a width W along the axis in said plane extending perpendicularly thereto and which is less than ½L, and wherein said rotation steps orient each of said arcuate surfaces $A^1$ and $A^2$ in the desired angular position for a multiplicity of steps of reciprocation.

4. The method in accordance with claim 3 wherein the cutting edge surfaces $A^1$ and $A^2$ extend along the opposite elongated sides of said cutting edge portion and wherein said rotation steps orient each of said arcuate surfaces $A^1$ and $A^2$ in the desired angular position for a multiplicity of steps of reciprocation.

5. The method in accordance with claim 4 wherein the cross section defined by said cutting edge portion is generally concavo-convex with said cutting surface $A^1$ being convex and said cutting surface $A^2$ being concave, and wherein said rotation steps orient each of said arcuate surfaces $A^1$ and $A^2$ in the desired angular position for a multiplicity of steps of reciprocation.

6. The method in accordance with claim 4 wherein the ends of said arcuate surfaces $A^1$ and $A^2$ are spaced apart and blend into convexly arcuate surfaces $A^3$ and $A^4$ defined by radii $R^3$ and $R^4$ respectively and wherein said rotation steps orient each of said arcuate surfaces $A^1$ and $A^2$ in the desired angular position for a multiplicity of steps of reciprocation.

7. The method in accordance with claim 3 wherein said cutting surfaces $A^1$ and $A^2$ are both arcuate surfaces extending along opposite elongated sides of said cutting portion with the radius $R^2$ defining the surface $A^2$ being smaller than the radium $R^1$ and wherein said rotation steps orient each of said arcuate surfaces $A^1$ and $A^2$ in the desired angular position for a multiplicity of steps of reciprocation.

8. The method in accordance with claim 7 wherein said cross section of said cutting portion is generally concavo-convex with said surface $A^1$ being convex and said surface $A^2$ being concave and wherein said rotation steps orient each of said arcuate surfaces $A^1$ and $A^2$ in the desired angular position for a multiplicity of steps of reciprocation.

9. The method in accordance with claim 8 wherein the ends of said arcuate surfaces $A^1$ and $A^2$ are spaced apart and blend into convexly arcuate surfaces $A^3$ and $A^4$ defined by radii $R^3$ and $R^4$ respectively, and wherein W is less than ¼L and wherein said rotation steps orient each of said arcuate surfaces $A^1$ and $A^2$ in the desired angular position for a multiplicity of steps of reciprocation.

10. The method in accordance with claim 1 including the additional steps of substituting a second punch and second die having a cutting edge portion with a configuration distinct from that of said first mentioned punch and die; and repeating steps (f)–(i) to provide cutouts of a configuration different from those produced by said first mentioned punch and die and thereby generate a large contoured cutout defined in part by the cutting edge surfaces of said first mentioned punch and die and in part by the cutting edge surfaces of said second punch and second die.

11. In a punch press, the combination comprising:
(a) a frame providing a base and a head spaced thereabove;
(b) a ram assembly mounted on said head of said frame with a lower portion reciprocatable on said head for movement along a vertical axis towards and away from said base;
(c) first drive means for reciprocating said lower portion of said ram assembly along said vertical axis;
(d) a punch having a cutting edge portion extending across the lower end of said punch in a common plane and including at least two cutting edge surfaces $A^1$ and $A^2$ of different contour, the cutting surface $A^1$ being arcuate and defined by the radius $R^1$ and the cutting surface $A^2$ being arcuate and defined by the radius $R^2$, said arcuate surfaces $A^1$ and $A^2$ being non-parallel;
(e) means supporting said punch for reciprocation with said lower portion of said ram assembly and for rotation about an axis substantially coaxial with said vertical axis of reciprocation of said ram assembly lower portion;
(f) a die having an aperture therein cooperatively dimensioned and configured to receive said cutting edge portion of said punch;
(g) means supporting said die in alignment with said punch and for rotation about an axis coaxial with said axis of rotation of said punch, said punch and die defining a workstation therebetween substantially in alignment with said vertical axis of reciprocation of said ram assembly lower portion;
(h) second drive means for effecting simultaneous and equivalent rotation of said punch and said die about said axis of rotation at said workstation;
(i) a work support table supported on said frame and extending about said die for supporting an associated workpiece thereon;
(j) workpiece clamping and moving means supported on said frame for controlled movement of the associated workpiece along X and Y axes relative to said workstation and the vertical axis of reciprocation and the axis of rotation of said punch and die;
(k) third drive means for said workpiece clamping and moving means;
(l) control means for controlling the operation of said first and second drive means to effect reciprocation of said ram lower portion and for controlling the operation of said second drive means to effect rotation of said punch and die when said punch is spaced above said die, and for controlling said third drive means for said workpiece clamping and moving means to effect precise indexing of the associated workpiece relative to said workstation along said X and Y axes between strokes of the ram assembly to produce contiguous cutouts therein, said control means including program means for generating a series of signals to the operative drive means following a punching stroke (i) to index the indexing means and thereby an assoicated workpiece in a horizontal plane a predetermined distance relative to said workstation to a second position which distance is not greater than the operative punch cutting edge surface, (ii) to rotate the punch and die about said vertical axis at said workstation to change the orientation of said operative cutting edge surface relative to said X and Y axes, (iii) to reciprocate the ram assembly in said second position of said clamping and moving means, (iv) to index the clamping and moving means in a horizontal direction to a further indexed position a distance not greater than a second punch cutting edge surface, (v) to rotate the punch and die about said vertical axis at said workstation to orient the second punch cutting edge surface in operative position; (vi) to reciprocate said ram assembly in said further indexed position of said indexing means, said series of signals producing a multiplicity of the steps (i) through (vi) above for defining the contour of a large contoured cutout in an associated workpiece by the cutting action of at least said two cutting surfaces and portions of the periphery of the cutout by rotated positions of at least one of said cutting surfaces, whereby the angular orientation of a cutting edge surface may be varied to approximate closely that desired contour for a large contoured cutout in the workpiece and cutting edge surfaces of different contours may be rotated into the contouring position.

12. The punch press of claim 11 wherein said cutting edge portion is elongated to provide an elongated cross section in said plane with a length L along an axis in the plane of the cutting edge surface extending in the direction of elongation and a width W along the axis in said plane extending perpendicularly thereto and which is less than $\frac{1}{2}$L.

13. The punch press of claim 11 wherein the cutting surfaces $A^1$ and $A^2$ are along the opposite sides of said cutting edge portion.

14. The punch press of claim 13 wherein the cross section defined by said cutting edge portion is generally concavo-convex with said cutting edge portion is generally concavo-convex with said cutting edge surface $A^1$ being convex and said cutting edge surface $A^2$ being concave.

15. The punch press of claim 13 wherein the ends of said arcuate surfaces $A^1$ and $A^2$ are spaced apart and blend into convex arcuate surfaces $A^3$ and $A^4$ defined by radii $R^3$ and $R^4$ respectively.

* * * * *

UNITED STATES PATENT AND TRADEMARK OFFICE
CERTIFICATE OF CORRECTION

PATENT NO. : 4,674,373

DATED : June 23, 1987

INVENTOR(S) : RUDI KUPPINGER

It is certified that error appears in the above-identified patent and that said Letters Patent is hereby corrected as shown below:

Column 11, line 66, "ege" should be "edge".

Column 14, line 5, "assoicated" should be "associated".

Column 14, line 32, "workpiece" should be "workpieces".

Column 14, line 43, after "opposite" insert --elongated--.

Column 14, lines 47 and 48, delete "portion is generally concavo-convex with said cutting edge".

Signed and Sealed this

First Day of December, 1987

Attest:

DONALD J. QUIGG

*Attesting Officer*   *Commissioner of Patents and Trademarks*